Feb. 6, 1923.

J. MAGDA.

CLUTCH.

FILED DEC. 5, 1921.

Inventor

John Magda.

By Arthur H. Sturges.

Attorney

Feb. 6, 1923.                      1,444,158
J. MAGDA.
CLUTCH.
FILED DEC. 5, 1921.                2 SHEETS-SHEET 2
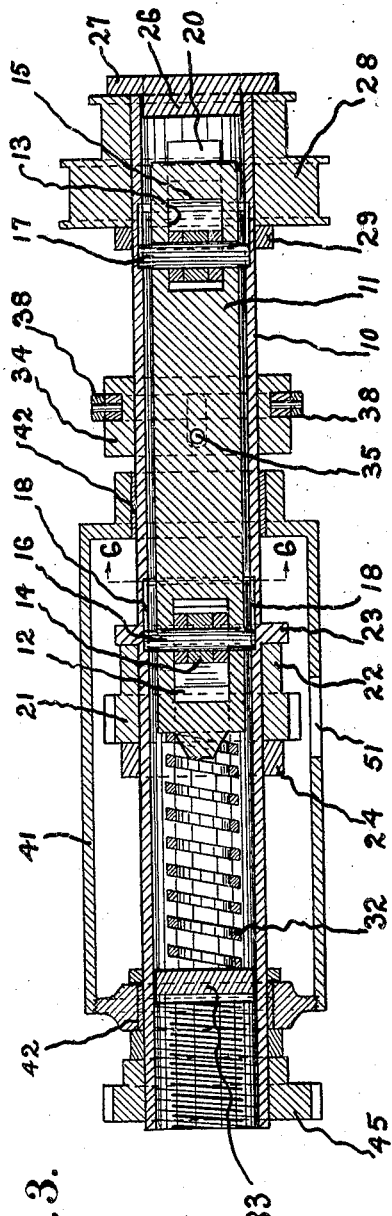
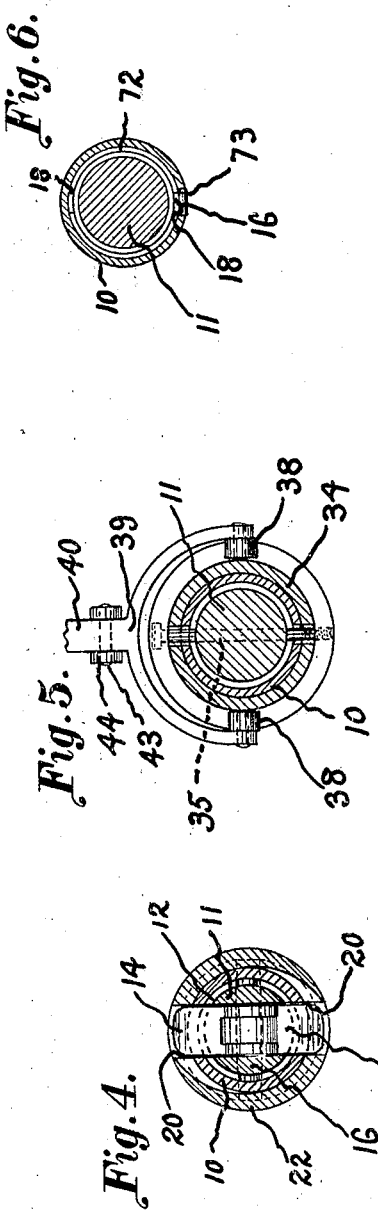
Inventor
John Magda
By Arthur H. Sturges.
Attorney Patented Feb. 6, 1923.

1,444,158

UNITED STATES PATENT OFFICE.

JOHN MAGDA, OF OMAHA, NEBRASKA.

CLUTCH.

Application filed December 5, 1921. Serial No. 520,150.

*To all whom it may concern:*

Be it known that I, JOHN MAGDA, a citizen of the United States, residing at Omaha, in the county of Douglas and State of Nebraska, have invented certain new and useful Improvements in Clutches, of which the following is a specification.

The present invention relates to clutches and more particularly to a clutch adapted for use in connection with motor cycles and under other conditions where a light reverse drive is required.

Another object of the present invention is to provide a novel type of reversing mechanism which may be used for driving a motor cycle or the like backwardly, such as when the motor cycle is provided with a side car; and to provide a device which may be used in connection with a cooling fan or for any other desired use, such as for operating a polishing or grinding mechanism or other tool.

The clutch or device of this invention will be herein described and shown in connection with a motor cycle, however, it is apparent that the clutch may be used in connection with the reverse gears of a turning lathe or certain laundry machinery, such as washing machines where a reciprocating rotary motion is desired.

Another object of the invention is to provide a reversing clutch attachment which may be easily installed upon transmission mechanism already in use without altering the construction thereof and without changing the relation between the parts.

With the foregoing and other objects in view, the invention will be more fully described hereinafter, and will be more particularly pointed in the claims appended hereto.

In the drawings, wherein like symbols refer to like or corresponding parts throughout the several views, Fig. 1, is a top plan view of the power plant of a motor cycle, the transmission and reversing mechanism being shown partly in section, of a structure embodying the features of this invention.

Fig. 3, is a similar view taken horizontally through the clutch.

Fig. 4, is a transverse section taken on the line 4—4 of Fig. 2 showing the parts interlocked.

Fig. 5 is a transverse section taken on the line 5—5 of Fig. 2 showing the shifting collar and its operating pedal; and Fig. 6, is a transverse section through the reversing clutch taken on the line 6—6 of Fig. 3.

Figures 1, 2:
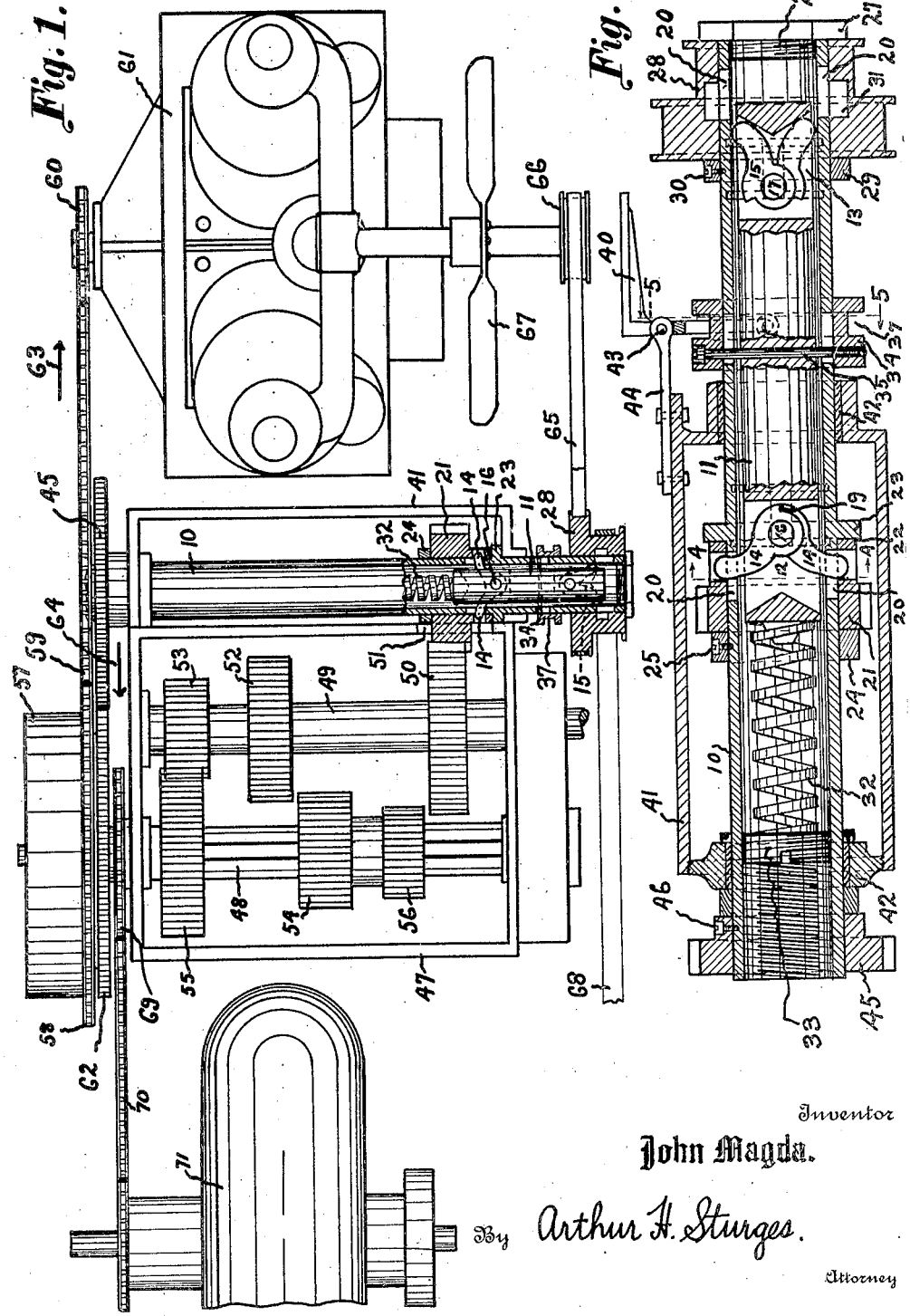
Fig. 2, is a longitudinal vertical section taken centrally through the reversing clutch.

Referring to the drawings the clutch comprises a tubular shaft 10 into which is slidably fitted an inner shaft 11 which is provided near opposite ends with transverse slots or recesses 12 and 13 in which are fitted pairs of dogs 14 and 15 pivotably mounted respectively on transverse pins 16 and 17. Each pin, 16 and 17, extends through the shaft 11 and engages at its opposite ends in longitudinal grooves 18 formed in the inner wall of the hollow shaft 10 to permit the shifting of the inner shaft 11 relatively to the tubular shaft 10. Each pair of dogs, 14 and 15, is interfitted at its inner ends, as shown, and is provided with stop shoulders 19 serving to limit the spreading of the dogs. The tubular shaft 10 is provided opposite of each dog with a longitudinal slot 20 through which the dogs are adapted to project when expanded or interlocking the inner shaft and outer shaft together with rotary members which may be mounted upon the tubular shaft 10. A gear wheel 21 is mounted upon the shaft 10 adjacent to the dogs 14 and has a clutch ring 22 suitably apertured to receive the extremities of the dogs when the latter are thrust through the slots 20. The pairs of dogs are adapted to fly apart or expand by centrifugal force incident to the rotation of the clutch. The gear wheel 21 and its ring 22 are held from shifting longitudinally upon the shaft 10 by a fixed flange 23 on the shaft which engages the ring 22 and an adjustable collar 24 secured to the shaft 10 against the gear wheel 21 by a set screw 25.

The outer end of the tubular shaft 10 is closed by a plug 26 having a flanged head 27 which extends beyond the exterior of the shaft and forms a fixed flange against which a pulley 28 may be held by an adjustable collar 29 held to the shaft by a set screw 30. The pulley 28 is provided with openings 31 adapted to register with the slots 20 and into which the extremities of the dogs 15 are adapted to project when the inner shaft 11 is shifted outwardly. The shaft 11 is normally held in an outward position by a coil spring 32 which is housed in the inner end of the shaft 10 and bears at one end against the shaft 11 and at its other end against a plug 33 which is threaded into the inner end of the shaft 10 for adjustably holding the spring under tension.

The shaft 11 may be shifted in any suitable manner, but preferably by a shifting collar 34 which is mounted slidably on the shaft 10 and which is secured to the shaft 11 by a transverse pin 35 extending entirely through the shaft 11 and connected at opposite ends to the sleeve 34. The pin 35 extends through and moves in longitudinal slots 36 of the tubular shaft 10 which permit the sleeve 34 to be shifted axially for moving the inner shaft 11 against the tension of the spring 32 and relatively to the outer shaft 10. The sleeve 34 has an angular groove 37 in its periphery and in which a pair of rollers 38 are adapted to operate, the rollers being mounted upon the ends of a fork 39 formed upon the lower end of a bell crank lever 40 which may be in the form of a treadle, as shown.

Any suitable means may be provided for supporting the clutch, and in the present showing, a casing or bracket 41 is employed and has at each end a suitable bearing 42 through which the ends of the shaft 10 may project, and in which the shaft may freely turn. The lever 40 is pivoted at 43, near its lower end upon a bracket arm 44 which is secured to the adjacent end of the casing 41 and which projects over the collar 34. The shaft 10 may be driven by a sprocket or gear wheel 45 which is removably fixed by a set screw 46 to the inner end of the shaft 10 at the outer side of the casing 41.

As shown in Fig. 1, the casing 41 of the reversing clutch may be secured to the forward end of the usual transmission casing 47 which has the parallel shafts 48 and 49. The shaft 49 is adjacent to the clutch and has a gear wheel 50 adapted to project into the casing 41, through the slot 51 therein, and into engagement with the gear wheel 21. The shaft 49 also has the change speed gears 52 and 53 which are arranged to respectively engage the gear wheels 54 and 55 by alternate shifting. The shaft 48 also has a gear wheel 56 adapted to be shifted into the engagement with the gear wheel 50 at times. The transmission mechanism of the motor cycle is provided with a clutch 57 of any suitable type which has a sprocket gear 58 over which travels a drive chain 59 which is carried over a drive sprocket 60 driven by the motor 61. The sprocket 58 has bolted to it a gear wheel 62 which meshes with the gear wheel 45 of the shaft 10 and which travels in the same direction as the chain 59, or in the direction indicated by the arrow 63. By this arrangement it will be noted that the gear wheel 45 with the shaft 10 is turned in the direction reverse to that shown by the arrow 63, or in the direction shown by the arrow 64. During the normal operation of the engine 61 for turning the shaft as thus described, the spring 32 holds the shaft 11 in its outermost position and consequently the dogs 15 interlock with the pulley 28 and drive the pulley with the shaft 10. The pulley 28 may carry a belt 65 which traverses a fan pulley 66 for operating a cooling fan 67 for the motor 61. The smaller pulley 28 upon its diametrically smaller portion which is integral with said pulley may also carry a second belt 68 for operating a generator or other suitable device dependent upon the mechanism to which the clutch may be applied.

During all of this operation the clutch 57 may be used for connecting the gears and the gear case 47 for driving the motor cycle forward in the usual manner. When it is desired to reverse the direction of travel of the motor cycle, the clutch 57 is thrown out of operation and the operator depresses the treadle 40 to shift the collar 34 inwardly and move the shaft 11 against the tension of spring 32 for withdrawing the dogs 15 and permitting the dogs 14 to expand. This shifting of the shaft 11, releases the pulley 28 so that the drive belts 65 and 68 are stopped and the gear wheel 21 is interlocked with the shaft 10 and turns the gear wheel 50 of the usual transmission mechanism. As shown in Fig. 1, the gear wheel 50 is turned in a forward direction and the gear wheel 53 is carried therewith and meshes with the gear wheel 55 which is turned in a reverse direction to turn the sprocket wheel 69 in reverse direction and through the chain 70 to turn the drive wheel 71 of the motor cycle backwardly.

It is apparent that this reversing mechanism may be used in various other combinations than as shown, such as when used with lathes, washing machines and other devices, it is of course understood that one or more pairs of the dogs may be employed dependent upon the conditions met with in installing these devices.

As shown in Fig. 6, to facilitate assembling of the parts, the shaft 10 may have annular grooves 72 formed therein in the walls of which the longitudinal grooves 18 may be cut, and the shaft 10 may also have removable plugs 73 in line with the pivot pins 16 and 17 for the introduction and removal of these pins.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. A clutch for the purpose set forth, comprising a tubular shaft having therethrough spaced openings, a slidable member mounted within the shaft, pairs of dogs pivotally associated with the shaft and maintained to rotate in unison therewith, a spring that engages the shaft having the dogs, and means for manually moving the encased shaft in an opposite direction from which it is moved by the spring to place different drives in positive engagement with the driven shaft.

2. The combination in a clutch mechanism, of a tubular shaft which is provided with diametrically opposite and longitudinally spaced apertures therethrough, a pair of drives rotatably mounted on said tubular shaft, a slidable member maintained within the shaft and in non-rotatable slidable engagement therewith, a pair of centrifugally projected dogs spaced for alternate outward movement and for separate effective operation, manually operated means for moving longitudinally the slidable member to place one of the pairs of dogs selectively in engagement with one of the drives on said tubular shaft, and means for rotating such shaft.

3. The combination in a clutch mechanism, of a tubular shaft having pairs of diametrically opposite openings, a pair of driving elements mounted on the tubular shaft to be in rotatable engagement therewith, a slidable member, a spring for moving the slidable member in one direction and means for manual actuation to move said member in an opposite direction from what it is moved by the spring, a pair of spaced dogs pivotally associated with the slidable member, the dogs being spaced so that only one pair will be in operative position simultaneously, and means for driving the tubular shaft.

4. The combination in clutch mechanism for the purpose set forth, of a tubular shaft having spaced openings, gears mounted rotatably on the shaft and provided with recesses which are adapted to be brought in alinement with the openings through the shaft, a reciprocal inner shaft carrying adjacent to its ends pairs of dogs, each pair being pivotally connected to the inner shaft, means for holding the inner shaft in non-rotatable engagement with the shaft in which it is housed, manually actuated means for moving the shaft to a position whereby one of the pairs of dogs will hold one of the gears in non-rotative engagement with the tubular shaft.

5. The combination in a device of the character set forth, of a tubular shaft, a gear maintained in fixed engagement therewith, other gears maintained in rotatable engagement with the shaft, a slidable sleeve positioned between the gears, a slidable inner shaft associated with the sleeve, dogs carried by the inner shaft, said dogs being positioned adjacent to the ends thereof and spaced to engage with one of the gears when said inner shaft is moved to its limit in one direction, such movement placing the other dogs in a non-operative position or out of engagement with the gear that is driven thereby.

6. In a device of the character set forth, a tubular shaft having a plurality of spaced openings which are opposite each other, a slidable member maintained in non-rotative engagement with the shaft, dogs arranged in pairs and in pivotal connection with the slidable member, means for moving the slidable member to locate only one of the pairs of dogs in such position that it will extend through and beyond the openings through the tubular shaft, gears rotatively mounted on the tubular shaft and provided with recesses into which the ends of the dogs will be passed when projected, means for moving the slidable member carried within the tubular shaft.

7. In a clutch, a casing, a tubular shaft mounted to turn in the casing and projecting through the opposite ends thereof, a drive gear on one end of the shaft, a driven element on the shaft in the casing adapted to turn freely on the shaft, a second driven element on the other end of the shaft, an inner shaft slidably mounted in the first shaft, a spring in one end of the first shaft engaging the inner shaft to normally hold it toward one end of the first shaft, pairs of pivoted dogs mounted on the inner shaft and adapted to be moved alternately into line with the driven elements upon the shifting of the inner shaft in opposite directions, a lever pivotally supported upon the casing, a shifting collar on the first shaft connected to the lever, and a slidable connection between the collar and the inner shaft for actuating the latter upon operation of the lever.

8. In combination with a transmission mechanism including a motor and a drive wheel connected through the transmission mechanism to the motor, a shaft connected to the transmission mechanism to be turned thereby in one direction, a driven member mounted to turn on the shaft and connected to an element of the transmission mechanism, a shiftable member in the shaft, a locking element carried by the shifting member for interlocking engagement at times with the freely rotatable driven element, and means connected to the shiftable member for actuating the same and the locking element when said transmission mechanism is disconnected from the motor whereby to drive said wheel through the shaft and the normally free driven member.

9. In combination with a motor, a transmission mechanism, a clutch between the transmission mechanism and the motor, and a drive wheel connected to the transmission mechanism, a shaft mounted on the side of the transmission mechanism and connected to the motor to be driven at all times thereby, a gear wheel freely mounted on the shaft and connected to the transmission mechanism for reverse movement relatively to the normal direction of turning of the gears thereof, and a shiftable locking means carried by the shaft adapted to be actuated for locking the freely turning gear on the shaft when said clutch is released whereby to drive the transmission mechanism reversely through the shaft.

10. In combination with a motor, a clutch, a transmission mechanism connected through the clutch with the motor and a drive wheel connected to the transmission mechanism and adapted to be driven thereby through the clutch in a forward direction, a shaft mounted upon one side of the transmission mechanism and connected to the motor to be driven reversely thereby at all times, a pair of gears mounted for free rotation upon the shaft with one gear connected to the transmission mechanism, drive belts mounted on the other gear, a pair of connected shiftable elements arranged in the shaft for alternately locking said gears to the shaft, means for normally holding the locking elements in position for locking the second gear to the shaft, and operating means for shifting the locking elements to release the second gear and lock the first gear to the shaft whereby to drive the wheel in a reverse direction through the transmission mechanism when the clutch is released.

In testimony whereof, I have affixed my signature in presence of two witnesses.

JOHN MAGDA.

Witnesses:
 ARTHUR H. STURGES,
 HIRAM A. STURGES.